United States Patent
Sung et al.

(10) Patent No.: US 10,337,868 B2
(45) Date of Patent: Jul. 2, 2019

(54) METHOD AND APPARATUS FOR RECOGNIZING MOTION FEATURE OF USER, USING ORTHOGONAL SEMISUPERVISED NON-NEGATIVE MATRIX FACTORIZATION (OSSNMF)-BASED FEATURE DATA

(71) Applicants: Samsung Electronics Co., Ltd., Suwon-si (KR); Postech Academy—Industry Foundation, Pohang-si (KR)

(72) Inventors: Jae-Mo Sung, Hwaseong-si (KR); Won-Keun Kong, Suwon-si (KR); Sae-Hun Kim, Pohang-si (KR); Seung-Jin Choi, Pohang-si (KR)

(73) Assignees: Samsung Electronics Co., Ltd., Suwon-si (KR); Postech Academy-Industry Foundation, Pohang-si (KR)

(*) Notice: Subject to any disclaimer, the term of this patent is extended or adjusted under 35 U.S.C. 154(b) by 840 days.

(21) Appl. No.: 14/159,790

(22) Filed: Jan. 21, 2014

(65) Prior Publication Data
US 2014/0207401 A1    Jul. 24, 2014

(30) Foreign Application Priority Data

Jan. 18, 2013 (KR) .................. 10-2013-0006012

(51) Int. Cl.
*G01C 21/16* (2006.01)
*G01C 25/00* (2006.01)

(52) U.S. Cl.
CPC ........... *G01C 21/16* (2013.01); *G01C 25/005* (2013.01)

(58) Field of Classification Search
CPC ........................ G01C 21/16; G01C 25/005
See application file for complete search history.

(56) References Cited

U.S. PATENT DOCUMENTS

| 8,416,102 B2 | 4/2013 | Yin |
| 2010/0117959 A1 | 5/2010 | Hong et al. |

(Continued)

FOREIGN PATENT DOCUMENTS

| JP | 2011-515123 A | 5/2011 |
| KR | 10-2010-0008071 | 1/2010 |

(Continued)

OTHER PUBLICATIONS

Chen et al., "Non-negative matrix factorization for semi-supervised data clustering," 2008, Springer-Verlag London Limited.*

(Continued)

*Primary Examiner* — Stephanie E Bloss
(74) *Attorney, Agent, or Firm* — NSIP Law

(57) ABSTRACT

An apparatus for recognizing a user's motions based on sensor information and label information, a method for establishing an ONMF-based basis matrix, and a method for establishing an OSSNMF-based basis matrix are provided, where the basis matrices are used to extract motion features of the user. The apparatus for recognizing the user's motions may include a feature vector extractor configured to multiply a transposed matrix of an orthogonalized basis matrix by a sensor data matrix of frequency domain sensor data acquired from sensors to extract an ONMF-based feature vector and a multi-class classifier configured to use the extracted ONMF-based feature vector to classify the user's motion into a type from among types of a user's motions.

17 Claims, 8 Drawing Sheets

(56) References Cited

U.S. PATENT DOCUMENTS

| | | | |
|---|---|---|---|
| 2011/0012759 A1 | 1/2011 | Yin | |
| 2011/0039522 A1 | 2/2011 | Partridge et al. | |
| 2011/0275408 A1* | 11/2011 | Kulik | G01C 17/34 455/556.1 |
| 2011/0301902 A1* | 12/2011 | Panagas | G01C 21/16 702/104 |
| 2011/0313650 A1* | 12/2011 | Tome | G01C 21/16 701/505 |

FOREIGN PATENT DOCUMENTS

| | | |
|---|---|---|
| KR | 10-2010-0052372 | 5/2010 |
| KR | 10-2010-0102450 | 9/2010 |
| KR | 10-2011-0078645 | 7/2011 |
| KR | 10-2012-0121595 A | 11/2012 |

OTHER PUBLICATIONS

Lu, H., Yang, J., Liu, Z., Lane, N. D., Choudhury, T., & Campbell, A. T. "The Jigsaw Continuous Sensing Engine for Mobile Phone Applications" In *Proceedings of the 8th ACM Conference on Embedded Networked Sensor Systems* (Nov. 3-5, 2010). (pp. 71-84).

Lee, Hyekyoung, Jiho Yoo, and Seungjin Choi. "Semi-Supervised Nonnegative Matrix Factorization." *Signal Processing Letters, IEEE* 17.1 (2010): (pp. 4-7).

Park, Sunho, et al., "Target Speaker Speech Restoration via Spectral bases Learning", *Journal of the Korean Institute of Information Scientists and Engineers*, 2009, pp. 179-186.

Korean Office Action dated Apr. 19, 2019 in corresponding Korean Patent Application No. 10-2013-0006012 (6 pages in English, 5 pages in Korean).

\* cited by examiner

METHOD AND APPARATUS FOR RECOGNIZING MOTION FEATURE OF USER, USING ORTHOGONAL SEMISUPERVISED NON-NEGATIVE MATRIX FACTORIZATION (OSSNMF)-BASED FEATURE DATA

CROSS-REFERENCE TO RELATED APPLICATION(S)

This application claims the benefit under 35 U.S.C. § 119(a) of Korean Patent Application No. 10-2013-0006012 filed on Jan. 18, 2013, in the Korean Intellectual Property Office, the entire disclosure of which is incorporated herein by reference for all purposes.

BACKGROUND

1. Field

The following description relates to an apparatus for recognizing a user's motion, a method for establishing an Orthogonal Non-negative Matrix Factorization (ONMF)-based basis matrix, and a method for establishing an Orthogonal Semi-Supervised Non-negative Matrix Factorization (OSSNMF)-based basis matrix. More specifically, the following description relates to an apparatus for recognizing a user's motions based on at least one of sensor and label information, a method for establishing an ONMF-based basis matrix, and a method for establishing an OSS-NMF-based basis matrix.

2. Description of Related Art

As mobile devices, such as smart phones and other similar mobile computing devices, have become popular, various researchers have initiated studies of recognizing or predicting a user's motion by using information acquired from various sensors included in such mobile devices.

However, due to the actions performed by the user, or the surroundings of the user, sometimes the measurement value acquired from the sensor cannot be accurately interpreted.

For example, in an example use case including a mobile device equipped with a plurality of sensors such as an acceleration sensor, a gyro sensor, a terrestrial magnetism sensor, and other similar sensors, there are some situations in which sensor measurement values provided for recognizing a user's motion based on the user's status. For example, a sensor result obtained in a state that the user stands still may differ from a result obtained when the user runs and walks. The motion recognition result may also vary depending on how the user holds the mobile device, such as if the user holds the mobile device in a hand or in a pocket.

Accordingly, there is needed a technology to accurately analyze a user's motion using a mobile device so as to recognize or predict the motion, regardless of the user's circumstances.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for recognizing a user's motions includes a feature vector extractor configured to multiply a transposed matrix of an orthogonalized basis matrix by a sensor data matrix of frequency domain sensor data acquired from sensors to extract an ONMF (Orthogonal Non-negative Matrix Factorization)-based feature vector, and a multi-class classifier configured to use the extracted ONMF-based feature vector to classify the user's motion into a type from among types of a user's motions.

The apparatus may further include a sensor data calibrator configured to calibrate at least a portion of the frequency domain sensor data, wherein the frequency domain sensor data is converted to have a global coordinate system by the sensor data calibrator using additional sensor data.

The feature vector extractor may be further configured to extract a non-ONMF-based feature vector including at least one of frequency domain sensor data and time domain sensor data, and integrate the ONMF-based feature vector and the non-ONMF-based feature vector to generate an integrated feature vector, and the multi-class classifier is further configured to use the integrated feature vector to classify the user's motion into a type from among types of a user's motions.

A basis matrix and an encoding matrix corresponding to the basis matrix may be converged to update the orthogonalized basis matrix.

The orthogonalized basis matrix may be an approximately orthogonal matrix produced using Stiefel manifolds.

In another general aspect, an apparatus for recognizing a user's motions includes a first feature vector extractor configured to multiply a sensor data matrix including frequency domain sensor data acquired from sensors by a transposed matrix of a first basis matrix orthogonalized with respect to the sensor data matrix to extract a first feature vector, a second feature vector extractor configured to multiply a label matrix including label information by a transposed matrix of a second basis matrix of the label matrix to extract a second feature vector, an integrated feature vector generator configured to integrate the first feature vector and the second feature vector to generate an integrated feature vector, and a multi-class classifier configured to use the integrated feature vector to classify the user's motion into a type from among types of a user's motions.

The second basis matrix may have the same encoding matrix as the first basis matrix.

The first basis matrix and an encoding matrix corresponding to the first basis matrix may be converged to update the first basis matrix.

In another general aspect, a method for generating an Orthogonal Non-negative Matrix Factorization (ONMF)-based basis matrix for extracting motion features of a user includes obtaining a sensor data matrix including sensor data acquired from sensors, extracting an integrated feature vector from the sensor data matrix including an ONMF-based feature vector, and generating a basis matrix of the integrated feature vector.

The generating of the basis matrix may further include randomly initializing the basis matrix and an encoding matrix of the basis matrix, updating an initialized basis matrix and an initialized encoding matrix, and orthogonalizing the basis matrix.

The basis matrix may be updated using Stiefel manifolds.

In another general aspect, a method for generating an Orthogonal Semi-Supervised Non-negative Matrix Factorization (OSSNMF)-based basis matrix for extracting motion features of a user includes acquiring sensor data measured from a plurality of sensors and a spectrogram of the sensor data, generating an integrated feature vector including an OSSNMF-based feature vector based on the spectrogram and label data, randomly initializing a first basis matrix of the sensor data, a second basis matrix of the label data, and an encoding matrix, updating an initialized first basis matrix, an initialized second basis matrix and an initialized encoding matrix, and generating a basis matrix of the integrated feature vector.

The method may further include terminating the updating of the initialized matrices in response to the first basis matrix converging to a stable value.

The updating may further include L2-normalizing the first basis matrix.

In another general aspect, an apparatus for generating an Orthogonal Non-negative Matrix Factorization (ONMF)-based basis matrix for extracting motion features of a user includes sensors, and a feature vector extractor configured to obtain sensor data from the sensors, extract an integrated feature vector from the sensor data including an ONMF-based feature vector, and generate a basis matrix of the integrated feature vector.

The apparatus may further include a sensor data calibrator configured to calibrate at least a portion of the sensor data.

The integrated feature vector may additionally include a non-ONMF-based feature vector including at least one of frequency domain sensor data and time domain sensor data.

The basis matrix may be an approximately orthogonal matrix produced using Stiefel manifolds.

Other features and aspects will be apparent from the following detailed description, the drawings, and the claims.

Figure 1:
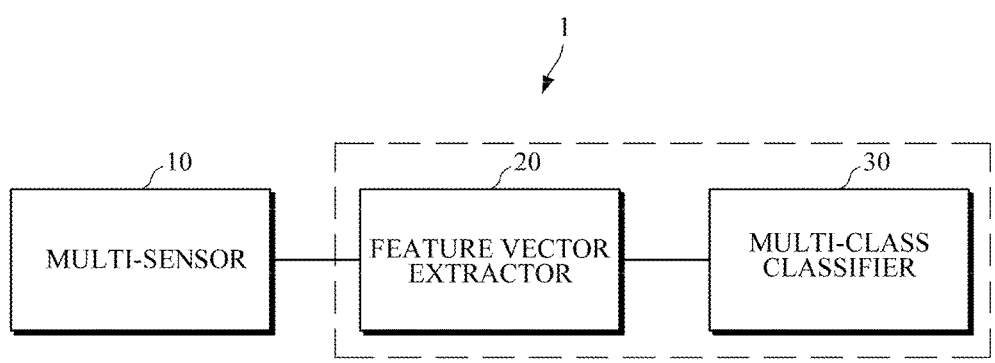
FIG. 1 is a diagram illustrating an example of an apparatus for recognizing a user's motions, according to an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

"A user's motion," as used herein refers to various types of movement a user may engage in. For example, "a user's motion" as used herein refers to one or more of types of movement such as standing, walking, running, walking up stairs, riding bicycles, etc. engaged in by the user. Also, as used herein, extracting motion features of a user using an apparatus for recognizing a user's motion refers to determining a type of motional states for a user whose movement is analyzed by the apparatus for recognizing the user's motions, regardless of a sensor location of the apparatus for recognizing the user's motions. Also, a technology to extract motion features of a user using Orthogonal Non-negative Matrix Factorization (ONMF) or Orthogonal Semi-Supervised Non-negative Matrix Factorization (OSSNMF) may be considered with respect to two aspects of such extraction, which are "generating" and "applying."

These two aspects are present in embodiments as follows. First, an apparatus and method for "generating" a basis matrix used in an apparatus for recognizing a user's motion based on ONMF or OSSNMF is provided. Second, an apparatus and method for extracting characteristics of a user's motions from predetermined sensor data by "applying" a generated basis matrix is provided. Thus, embodiments perform these related functions that sensor data is used to construct a basis matrix and subsequently that basis matrix permits analysis of the sensor data so as to characterize the user's motions.

FIG. 1 is a diagram illustrating an example of an apparatus for recognizing a user's motions, according to an embodiment.

The apparatus 1 illustrated in FIG. 1 is related to the second aspect as described above. That is, the apparatus 1 illustrated in FIG. 1 is constructed so as to extract characteristics of a user's motions from predetermined sensor data by "applying" a generated basis matrix to the sensor data, thereby producing information about the characteristics of the user's motions.

As illustrated in FIG. 1, the apparatus 1 for recognizing the user's motions includes a feature vector extractor 20 and a multi-class classifier 30.

The feature vector extractor 20 multiplies a sensor data matrix, according to sensor data acquired from a plurality of sensors of a multi-sensor 10, by a transposed matrix of a basis matrix which is orthogonalized to the sensor data matrix. Thereby, the feature vector extractor 20 extracts a feature vector of the user's motions.

As noted, the basis matrix is orthogonalized to the sensor data matrix. As an example, the basis matrix is an approximately orthogonalized matrix using Stiefel manifolds. For brevity, omitted is a discussion of a complex process to calculate an inverse matrix of the basis matrix which is then multiplied by the sensor data matrix. However, as an alternative approach provided in the embodiment discussed above, a feature vector of the user's motions is extracted by the feature vector extractor 20 simply by multiplying the sensor data matrix by the transposed matrix of the basis matrix instead of the inverse matrix of the basis matrix.

Next, a multi-class classifier 30 classifies the feature vector, which is extracted from the feature vector extractor 20 based on ONMF, as corresponding to one type of motion among two or more potential types of a user's motions.

The multi-class classifier 30 includes a classification system to classify the feature vector into one type among two or more types of the user's motions. The classification system used by the multi-class classifier 30 is discussed further, below.

Figure 2:
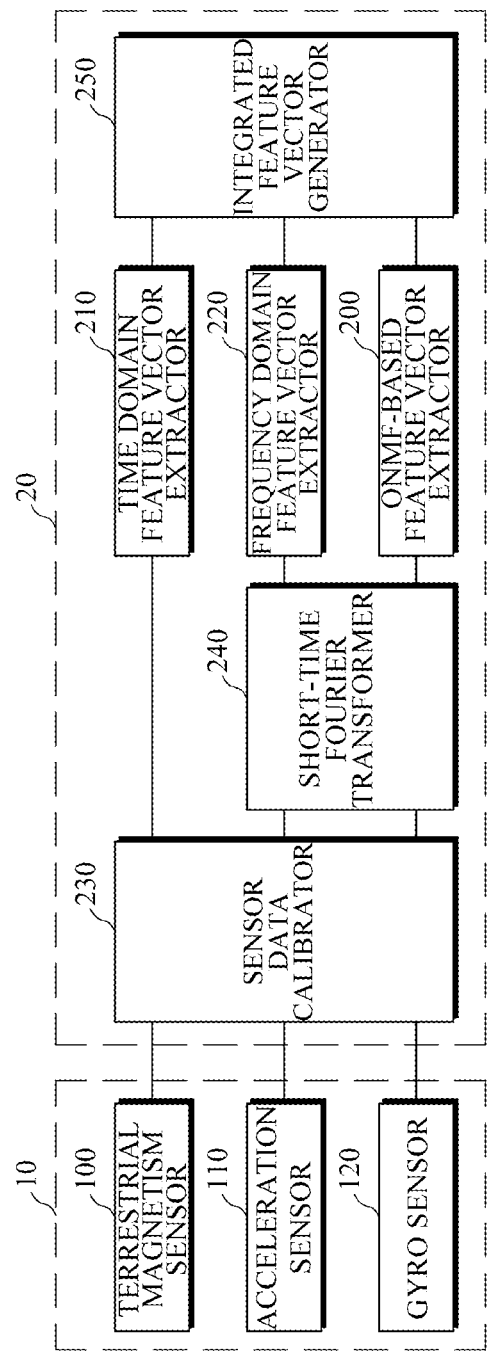
FIG. 2 is a diagram more specifically illustrating an example of a feature vector extractor of an apparatus for recognizing a user's motions as illustrated in FIG. 1, according to an embodiment.

FIG. 2 is a diagram illustrating in detail an example of a feature vector extractor of an apparatus for recognizing a user's motions as illustrated in FIG. 1, according to an embodiment.

As illustrated in FIG. 2, the feature vector extractor 20 further includes a sensor data calibrator 230, a short time Fourier transformer 240, a time domain feature vector extractor 210, a frequency domain feature vector extractor 220, an ONMF-based feature vector extractor 200, and an integrated feature vector generator 250.

In order to extract a feature vector, the feature vector extractor 20 extracts a feature vector from sensor data. In the embodiment presented in FIG. 2, the sensor data is transmitted from a multi-sensor 10 and is received by the feature vector extractor 20. In an example, the multi-sensor 10 is communicatively coupled to the feature vector extractor 20 so that it may provide the sensor data to the feature vector extractor 20. For example, the sensor data may be communicated from various sensors in the multi-sensor 10 to the sensor data calibrator 230 of the feature vector extractor 20, as will be discussed further, below. The multi-sensor 10 may include a terrestrial magnetism sensor 100, an acceleration sensor 110, a gyro sensor 120, and other sensors. The sensors provided in FIG. 1 are merely intended as examples, and other sensors may be incorporated into the multi-sensor 10 to provide sensor data that may be used by the feature vector extractor 20 to produce the feature vector. In the embodiment of FIG. 1, the multi-sensor 10 is presented as being located externally from the apparatus 1. However, embodiments are not limited to having the multi-sensor 10 being located externally from the apparatus 1. Thus, in some embodiments, all or part of the multi-sensor 10 is integrated into the apparatus 1 for recognizing the user's motions.

The sensor data calibrator 230 calibrates the sensor data. As discussed above, the sensor data is derived from a plurality of individual sensors provided as part of the multi-sensor 10. The plurality of individual sensors that are part of the multi-sensor 10 are communicatively coupled to the sensor data calibrator 230 in order to perform a calibration operation so that the sensor data is prepared properly for feature vector extraction. The calibration combines information received from multiple sensors to derive additional meaning from the sensor data. For example, the sensor data calibrator 230 calibrates acceleration sensor data received from an acceleration sensor 110 into a global coordinate system, such as a world coordinate system, using the sensor data from a terrestrial magnetism sensor 100. By combining sensor information in this manner, the sensor data calibrator 230 to begin with sets of sensor data, and provide sensor data that accumulates different type of sensor information so that it may all be considered simultaneously.

In an embodiment, the multi-sensor 10 and the feature vector extractor 20 use a continuous sensing engine, such as the JigSaw sensing method. In a JigSaw sensing method, the acceleration sensor data acquired from a 3-axis acceleration sensor, such as the acceleration sensor 110, is converted from an acceleration coordinate system used by the acceleration sensor 110 itself into a two-dimensional space that consists of a vertical direction $v_i$ and a horizontal direction $h_i$. In such a method, where an average value of N pieces of previously obtained acceleration sensor data is represented as 'g' and a present acceleration data value is represented as 'a', the acceleration data value is converted into a two-dimensional space by Formula 1 below.

$$v_i = (a_i^T g)^* g, h_i = a_i - v_i \quad \text{Formula 1}$$

However, in a case of converting the acceleration coordinate system by Formula 1, the problem that the horizontal direction $h_i$ cannot be exactly obtained arises.

In embodiments, the sensor data calibrator 230 contributes to solving the above problem by converting the coordinate system of the acceleration sensor data acquired from the acceleration sensor 110 into a world coordinate system using the terrestrial magnetism sensor data acquired from the terrestrial magnetism sensor 100. That is, although represented using the local coordinate system of the apparatus, the acceleration sensor data may be converted into the world coordinate system using rotation matrices of yawing, pitching, and rolling, which are estimated by the terrestrial magnetism sensor 100. Thus, the sensor data calibrator 230 is able to characterize the motions of the multi-sensor 10 as rotations rather than translational accelerations, which provides data that is more useful later on as part of the feature vector extraction process.

Accordingly, the acceleration sensor data may be acquired and characterized in a world coordinate system, regardless of the direction of motion of the apparatus. Consequently, because the acceleration sensor data is processed to yield data that is informative about the rotations of the apparatus, it is possible to achieve a motion recognition system that is resistant to changes and provides meaningful information about a user's motion as the user undergoes different accelerations.

The short-time Fourier transformer 240 converts sensor data from the time domain into the frequency domain, and then acquires spectrograms based on the conversion. Because acquired sensor data is generally the time domain sensor data, in which the sensor measures how a given quantity with respect to time, the sensor data is converted into the frequency domain in advance, in which sensor information is characterized by how much of the signal lies within frequency bands over a range of frequencies. By performing this conversion, it allows the sensor information to be utilized by the feature vector extractor 200 and the frequency domain feature vector extractor 220.

The short-time Fourier transformer 240 applies a Short-Time Fourier Transform (STFT) to the sensor data of the given time domain, as discussed above, with a pre-set window size being used by the STFT to generate a spectrogram in a frequency domain from the sensor data of the given time domain. For example, the multi-sensor 10 may additionally provide gyro sensor data obtained from a gyro sensor 120 that is one of the sensors of the multi-sensor 10. In such an example, by applying an STFT to the acceleration sensor data, obtained as discussed above and to the gyro sensor data, using a pre-set window size, the short time Fourier transformer 240 acquires the spectrograms.

The time domain feature vector extractor 210 extracts time domain features from each type of the sensor data provided by the multi-sensor 10. The sensor data used by the time domain feature vector extractor 210 is potentially previously processed by sensor data calibrator 230, as discussed above. The time domain features include, for example, the mean, the variance and the mean crossing rate of the sensor data. However, other time domain features may be used in lieu of or in addition to these example features.

The frequency domain feature extractor 220 extracts frequency domain features from each of the types of sensor data as discussed above, excluding the features extracted from the sensor data using ONMF-based feature vector extractor 200. For convenience of description, the features extracted from the sensor data using the ONMF-based feature vector extractor 200 are referred to as "NMF features", and the features extracted from the frequency domain feature vector extractor 220 are referred to as "Non-NMF features".

The Non-NMF frequency domain features may include, for example, a spectrum peak, sub-band energy, sub-band energy ratio, spectral entropy, and other features that characterize the frequency domain of the sensor data. However, other Non-NMF frequency domain features may be used in lieu of or in addition to these example features.

The integrated feature vector generator 250 integrates the feature vector extracted from the ONMF-based feature vector extractor 200 and the feature vectors extracted from each of the time domain feature vector extraction 210 and the frequency domain feature vector extraction 220, and generates an integrated feature vector based on these other feature vectors that characterizes the sensor data gathered by the multi-sensor 10 and processed by the elements of the feature vector extractor 20. While FIG. 2 illustrates various elements of the feature vector extractor 20 that provide the feature extraction, other approaches to feature extraction may be used in lieu of or in addition to these example approaches.

The integrated feature vector includes a component of the ONMF-based feature vector. However, in some embodiments the integrated feature vector includes one or both of components of the time domain feature vector and Non-NMF-based frequency feature vector, but in other embodiments the integrated feature vector does not include components of the time domain feature vector and Non-NMF-based frequency feature vector.

Figure 3:
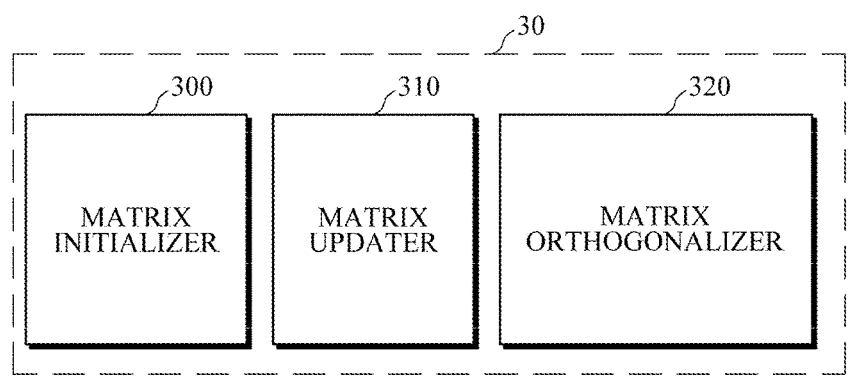
FIG. 3 is a diagram illustrating an example of an apparatus for generating a basis matrix based on Orthogonal Non-negative Matrix Factorization (ONMF) for extracting motion features of a user, according to an embodiment.

FIG. 3 is a diagram illustrating an example of an apparatus for generating an ONMF-based basis matrix for extracting motion features of a user, according to an embodiment.

As illustrated in FIG. 2, in order that the apparatus for recognizing user's motions is able to extract motion features of the user from inputted sensor data, a basis matrix orthogonalized with respect to sensor data matrix is generated. FIG. 3 is a diagram illustrating of to an apparatus that uses such an approach for generating a basis matrix.

As illustrated in FIG. 3, the apparatus for generating an ONMF-based basis matrix includes a matrix initializer 300, a matrix updater 310 and a matrix orthogonalizer 320.

Non-negative Matrix Factorization (NMF) is a technique that factorizes a non-negative matrix X into a basis matrix A and a non-negative encoding matrix S, as represented by Formula 2. Here, the non-negative matrix X corresponds to "the sensor data matrix".

$$X = A*S \quad \text{Formula 2}$$

The features that classify a user's motions are considerably more recognizable in the frequency domain than in the time domain. Additionally, the frequency domain features of the sensor data are potentially available from spectrograms. For example, such spectrograms are acquired by applying Short-Time Fourier Transform (STFT) to the sensor data of the given time domain based on a preset window size.

When the non-negative matrix factorization technique is applied to the sensor data, it guarantees that all elements of the spectrogram are non-negative. Because of this guarantee, features of data are extracted from the spectrogram more easily.

Also, by the NMF technique, an objective function to obtain the basis matrix A and the encoding matrix S in Formula 2 is provided as Formula 3. In addition, the basis matrix A and the encoding matrix S, both meeting the objective function, may be obtained as Formula 4 by repeatedly applying a multiplicative update algorithm thereto.

$$J(A, S) = \|W*(X - AS)\|_F^2, \quad \text{Formula 3}$$
$$A, S \geq 0$$

$$A \leftarrow A * \frac{XS^T}{ASS^T} \quad \text{Formula 4}$$
$$S \leftarrow S * \frac{A^T X}{A^T AS}$$

Thus, using the Non-negative Matrix Factorization (NMF), if the basis matrix A is obtained by using Formula 4 as an update formula, a pseudo-inverse of the basis matrix A is acquired and then the data matrix is projected. Using such a technique, the motion features of the user are extracted from the sensor data.

However, if there are n number of features to be extracted, the generating such a pseudo-inverse of the basis matrix requires as much calculation as $O(n^3)$. While this metric of the number of operations increases in polynomial time, as the number of features "n" increases, problems arise when generating the pseudo-inverse of the basis matrix because of the increase in resources necessary to generate the pseudo-inverse of the basis matrix. For example, more time is spent performing larger amounts of calculation, more processor resources are required to perform the calculations, etc. In general, as the basis matrix encompasses more features, the demands necessary to generate its pseudo-inverse grow rapidly.

The apparatus for generating an ONMF-based basis matrix as illustrated in FIG. 3 addresses the above issues by providing a technique to extract the data features while avoiding the need to calculate the pseudo-inverse of the basis matrix.

More specifically, as shown in Formula 5, the basis matrix is restricted so that it is forced to meet the condition of orthogonality, and thereby calculating the pseudo-inverse is skipped. The condition of orthogonality corresponds to the requirement that the transpose of the matrix is equal to its inverse. This technique of placing such a condition on the basis matrix is described as "Orthogonal Non-negative Matrix Factorization (ONMF)".

$$A^T A = I \quad \text{Formula 5}$$

FIG. 3 illustrates how this approach may be implemented. In FIG. 3, the matrix initializer 300 randomly initializes the basis matrix A and the encoding matrix S according to the sensor data matrix X, as discussed above.

The matrix updater 310 updates an initialized basis matrix and an initialized encoding matrix. The updating performed by matrix updater progressively improves the factorization to obtain the best possible basis matrix A and the best possible encoding matrix X so as to cause them to meet the objective function while remaining orthogonal. For example, the matrix updater 310 repeatedly perform the updating until it obtains the basis matrix A and the encoding matrix S, which both minimize Formula 3 and meet Formula 5.

The matrix orthogonalizer 320 performs orthogonalization of the basis matrix A that was previously updated by the matrix updater 310. In one example, the basis matrix A is be approximately updated using Stiefel manifolds. However, Stiefel manifolds are only one way of updating basis matrix A and other analytical and mathematical techniques may be used in lieu of or in addition to Stiefel manifolds.

Figure 4:
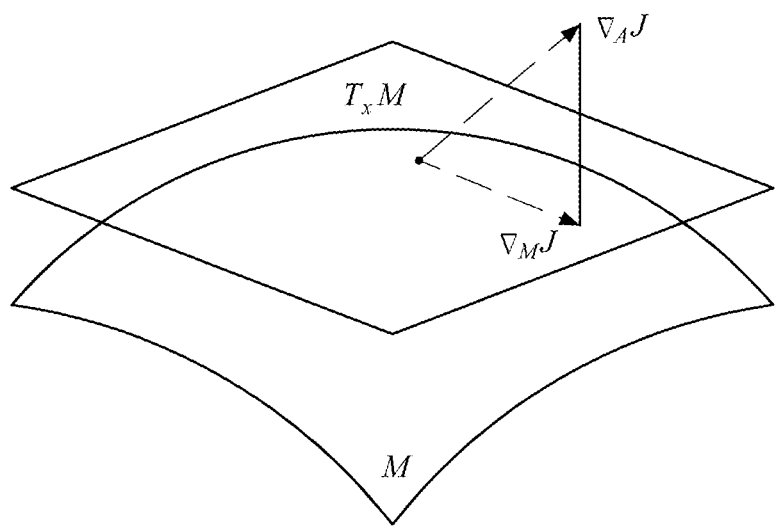
FIG. 4 is a diagram illustrating an example of orthogonalization of a basis matrix using Stiefel manifolds, according to an embodiment.

FIG. 4 is a diagram illustrating an example of orthogonalization of a basis matrix using Stiefel manifolds, according to an embodiment.

ONMF minimizes an objective function that corresponds to the objective function that is used in NMF. However, a constraint that the basis matrix A is required to be an orthogonal matrix is added.

In FIG. 4, Stiefel manifolds are applied to orthogonalize the basis matrix A. The Stiefel manifolds are a set of orthogonal matrices. As will be discussed further, the Stiefel manifolds are applied to orthogonalize a specific matrix.

$$\nabla_M J = \nabla_A J + A \nabla_A J^T A \quad \text{Formula 6}$$

Generally, to minimize Formula 6 with respect to the basis matrix A, an update is performed in the opposite direction of the gradient ($\nabla_A J$) of the basis matrix A. Because the gradient ($\nabla_A J$) of the basis matrix A is directed in the direction corresponding to the rate of greatest increase, updating in the opposite direction of the gradient will minimize the Formula 6. However, in the majority of cases, gradient $\nabla_A J$ is placed in a direction that orthogonal characteristics of the basis matrix A is not satisfied.

Accordingly, in some embodiments, the matrix orthogonalizer 320 calibrates the gradient $\nabla_A J$ by using the Stiefel manifolds. Such calibration, which will be described further, modifies the gradient $\nabla_A J$ so as to enable the gradient $\nabla_A J$ to meet the constraint that the basis matrix A should be kept orthogonal as much as possible.

In FIG. 4, M represents Stiefel manifolds, and $\nabla_A J$ is a gradient at a present position.

Here the direction of $\nabla_A J$ is irrelevant to the Stiefel manifolds. That is, $\nabla_A J$ does not inherently consider the requirement of orthogonality. Therefore, the orthogonal characteristics may not be met if an update is performed in the direction of $\nabla_A J$. Accordingly, to achieve these orthogonal characteristics, the update is performed by obtaining a modified gradient ($\nabla_M J$) revised by projecting $\nabla_A J$ on the tangential plane of the Stiefel manifolds.

In FIG. 4, $T_X M$ represents a tangential plane of the Stiefel manifolds, and $\nabla_M J$ is a gradient obtained by projecting $\nabla_A J$ on the tangential plane, using appropriate mathematical techniques.

Accordingly, if the matrix updater 310 updates the basis matrix A using $\nabla_M J$, an approximate orthogonalized matrix is acquired, rather than an accurate matrix, which is not necessarily orthogonal. Consequently, using $\nabla_M J$ acquired from Formula 6, the approximately orthogonalized basis matrix A is acquired.

Here, the updating process of the orthogonalized basis matrix discussed above as being based on Formula 6 may be simplified as the following Formula 7. That is, Formula 7 provides a unified update formula with a function that orthogonalizes a matrix.

$$[A]_{ij} \leftarrow [A]_{ij} \frac{[XS^T]_{ij}}{[ASX^T A]_{ij}} \quad \text{Formula 7}$$

For example, a particular approach that uses L2 normalization that is performed at every update to enable the basis matrix A to stably converge is provided as Formula 8.

$$[A]_{ij} \leftarrow \frac{[A]_{ij}}{\Sigma_i [A]_{ij}^2} \quad \text{Formula 8}$$

Figure 5:
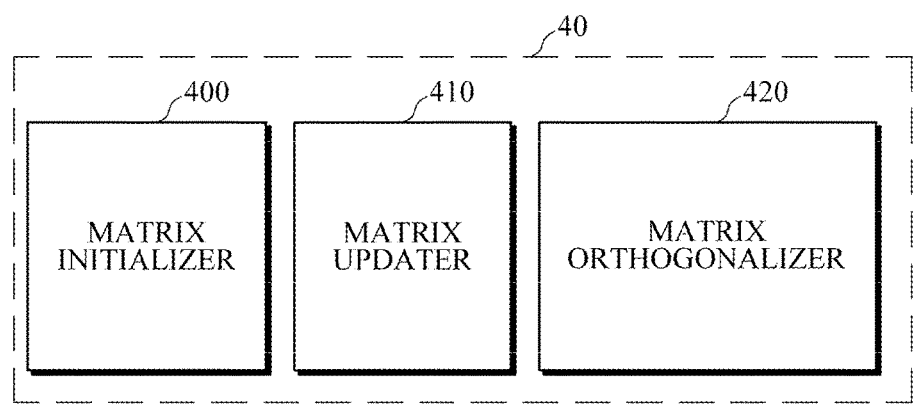
FIG. 5 is a diagram illustrating an example of an apparatus for generating a basis matrix based on Orthogonal Semi-Supervised Non-negative Matrix Factorization (OSSNMF) for extracting motion features of a user, according to an embodiment.

FIG. 5 is a diagram illustrating an example of an apparatus for generating an OSSNMF-based basis matrix for extracting motion features of a user, according to an embodiment.

The Non-negative Matrix Factorization (NMF) approach efficiently finds data characteristics, as discussed above, but it is difficult to use label information in this approach. However, according to the Semi-Supervised Non-negative Matrix Factorization (SSNMF) approach, not only a non-negative sensor data matrix but also a matrix about label information pertaining to the sensor data may be utilized, and use of these multiple types of data makes it possible to more accurately extract the data characteristics.

More specifically, where the data matrix is given as X and the label matrix is given as Y, the data matrix X and the label matrix Y may be factorized as provided in Formula 9 by using the common encoding matrix S according to the SSNMF.

$$X \approx AS$$

$$Y \approx BS \quad \text{Formula 9}$$

As illustrated in FIG. 5, the apparatus for generating an OSSNMF-based basis matrix 40 includes a matrix initializer 400, a matrix updater 410 and a matrix orthogonalizer 420. However, in other embodiments such an apparatus may include other constituent parts in lieu of or in addition to these parts in order to perform the functionality of generating an OSSNMF-based basis matrix.

The matrix initializer 400 randomly initializes a basis matrix A, a basis matrix B and an encoding matrix S that is common to both of the basis matrices, based on a sensor data matrix X and a label matrix Y.

The matrix updater 410 performs updates with respect to the initialized basis matrix A and B, and the initialized encoding matrix S. For example, the update may be performed until the basis matrices A and B and the encoding matrix S which minimize Formula 10 are acquired.

$$J(A,B,S) = \|W^*(X-AS)\|_F^2 + \lambda \|L^*(Y-BS)\|_F^2, \quad A^T A = 1,$$
$$A,B,S \geq 0 \quad \text{Formula 10}$$

Here, L represents a weight matrix that is used to take into consideration any data item or items whose label is not available.

For example, if a data label exists, matrix components corresponding to the label in L are filled with "1," and if the data label does not exist, matrix components corresponding to the label in L are filled with "0". If L represents data labels in such a manner, Formula 10, is structured such that L will automatically cause Formula 10 to take into account the availability of data labels.

A matrix orthogonalizer 420 performs orthogonalization of the basis matrix A that is updated by the matrix updater 410. At this time, the basis matrix A may be approximately updated via Stiefel manifolds, in a manner similar to that discussed above.

Accordingly, if the matrix updater 410 performs an update of the basis matrix A using $\nabla_M J$ as defined above, the approximate orthogonalization matrix may be acquired. For example, the updating process of the orthogonalized basis matrices for the OSSNMF process is simplified as the following Formula 11.

$$[A]_{ij} \leftarrow [A]_{ij} \frac{[[W*X]S^T]_{ij}}{[[W*AS]S^T]_{ij}}$$

$$[B]_{ij} \leftarrow [B]_{ij} \frac{[[L*Y]S^T]_{ij}}{[[L*BS]S^T]_{ij}}$$

$$[S]_{ij} \leftarrow [S]_{ij} \frac{[A^T[W*X]]_{ij} + \lambda[B^T[L*Y]]_{ij}}{[A^T[W*AS]]_{ij} + \lambda[B^T[L*BS]]_{ij}}$$

Formula 11

Also, in order to enable the basis matrix A to stably converge, L2 normalization to be performed at every update may be shown as Formula 12.

$$[A]_{ij} \leftarrow \frac{[A]_{ij}}{\Sigma_i[A]_{ij}^2}$$

Formula 12

An objective formula used by the apparatus of FIG. 5 to perform matrix factorization is represented as Formula 13. In performing matrix factorization in this context, there may be missing data and some data lacking label information. To prevent this, a matrix W for the missing sensor data and a matrix L for processing the data which does not have the label information may be further included. For example, the matrix W may include matrix information such that where the sensor information is present is filled with "1," and if the sensor information does not exist, matrix information corresponding to the sensor information in W are filled with "0".

$J(A,B,S)=\|W*(X-AS)\|_F^2+\lambda\|L*(Y-BS)\|_F^2$, $A^TA=I$, $A,B,S\geq 0$

Formula 13

Thus, in FIG. 5, the apparatus for generating an OSSNMF-based basis matrix 40 approximately orthogonalizes the basis matrix as discussed herein. By operating in this manner, data characteristics are simply calculated from a transposed matrix of the basis matrix, without calculating a pseudo-inverse of the basis matrix. As discussed above, because calculating a pseudo-inverse of the basis matrix consumes considerable resources, the OSSNMF-based may produce good results efficiently.

That is, to figure out Formula 13, general SSNMF should perform an update as provided below in Formula 14. At this time, a sensor data matrix X is projected onto a basis matrix A that is obtained by the update, and thereby characteristics of the sensor data may be extracted.

$$[A]_{ij} \leftarrow [A]_{ij} \frac{[[W*X]S^T]_{ij}}{[[W*AS]S^T]_{ij}}$$

Formula 14

-continued $$[B]_{ij} \leftarrow [B]_{ij} \frac{[[L*Y]S^T]_{ij}}{[[L*BS]S^T]_{ij}}$$

$$[S]_{ij} \leftarrow [S]_{ij} \frac{[A^T[W*X]]_{ij} + \lambda[B^T[L*Y]]_{ij}}{[A^T[W*AS]]_{ij} + \lambda[B^T[L*BS]]_{ij}}$$

Meanwhile, the apparatus for generating an OSSNMF-based basis matrix in FIG. 5 updates the basis matrix A such that it is forced to meet the condition of orthogonality, and thereby omits calculation of a pseudo-inverse. Such an approach, presented in FIG. 5, is described as "Orthogonalized" Semi-Supervised Non-negative Matrix Factorization (OSSNMF).

Figure 6:
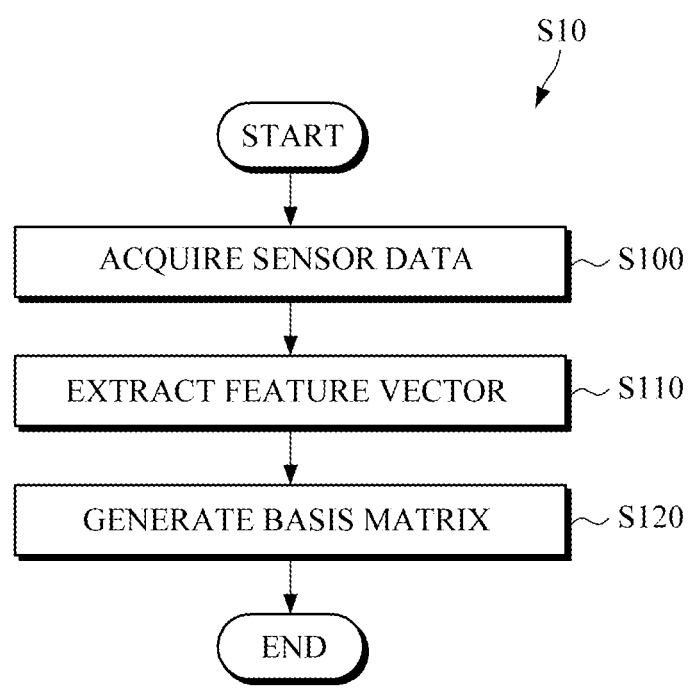
FIG. 6 is a flowchart illustrating a method for generating an ONMF-based basis matrix for extracting motion features of a user, according to an embodiment.

FIG. 6 is a flowchart illustrating a method for generating an ONMF-based basis matrix for extracting motion features of a user, according to an embodiment.

As illustrated in FIG. 6, a method S10 for generating an ONMF-based basis matrix for extracting motion features of a user includes acquiring sensor data in S100, extracting a feature vector in S110 and generating a basis matrix in S120.

In S100 of acquiring sensor data, the method acquires the sensor data matrix with respect to sensor data which is measured from a plurality of sensors.

Then, in S110, the method extracts an integrated feature vector including a component of an ONMF-based feature vector. At this time, a revision of the sensor data, such as a calibration and/or a process of converting a time domain into a frequency domain, or other processes to aid in extracting the integrated feature vector may be further performed.

In S120, the method generates a basis matrix of the integrated feature vector.

The operation S120 may include further operations of initializing a matrix, updating a matrix and orthogonalizing a matrix (not illustrated). These different aspects of generating a basis matrix have been discussed above with respect to the preceding figures.

In one example of the operation of initializing a matrix, a basis matrix A and an encoding matrix S of a sensor data matrix X is randomly initialized. However, in another example, the basis matrix A and the encoding matrix S may be initialized with seed values that facilitate generating a basis matrix.

In the operation of updating a matrix, the updating of the initialized basis matrix and the initialized encoding matrix are performed. For example, the updating may include repeatedly performing updating operations until acquiring an updated basis matrix A and an updated encoding matrix S, which both minimize Formula 3 and meet Formula 5.

In the operation of orthogonalizing a matrix, an orthogonalization of the updated basis matrix A is performed. At this time, the orthogonalization of basis matrix A may be achieved using Stiefel manifolds.

Figure 7:
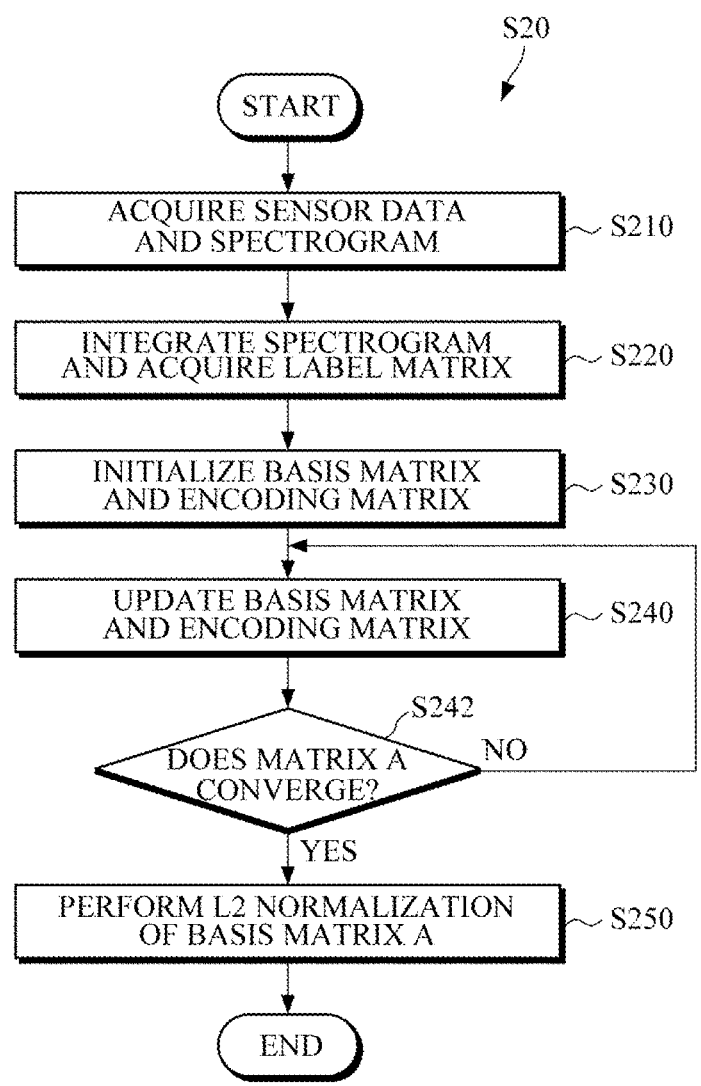
FIG. 7 is a flowchart illustrating a method for generating an OSSNMF-based basis matrix for extracting motion features of a user, according to an embodiment.

FIG. 7 is a flowchart illustrating a method S20 for generating an OSSNMF-based basis matrix for extracting motion features of a user, according to an embodiment.

In S210, the method acquires sensor data and a spectrogram. In acquiring sensor data in S210, sensor data measured from a plurality of sensors and a spectrogram thereof are acquired.

Then, in S220, the method integrates each spectrogram acquired in S210, and acquires a label matrix is acquired. At this time, a component of an ONMF-based feature vector is included in an integrated feature vector, and a component of a non-ONMF-based frequency domain feature vector and/or a time domain feature vector may optionally be included.

Then, in S230, the method initializes a basis matrix and an encoding matrix. The method for generating an OSSNMF-based basis matrix uses additional matrices containing label information, so in the OSSNMF-based approach basis matrices A and B should be randomly initialized with respect to a data matrix X and a label matrix Y, respectively. Also, an encoding matrix X which is common to both of the basis matrices is randomly initialized.

Then, in S240, the method updates initialized basis matrices A and B and the initialized encoding matrix S. In an embodiment, the updating is performed until the basis matrices A and B and the encoding matrix S which minimize Formula 10 as mentioned above are successfully acquired. In S242, the method determines if the basis matrix A converges to a specific value. If so, the updating ends. If basis matrix A does not converge to a specific value, the updating is performed again in S240.

In an example, matrix orthogonalization is performed along with the matrix update.

Meanwhile, in an example, in order to enable the basis matrix A to stably converge, the method performs L2 normalization of the basis matrix A in S250.

Figure 8:
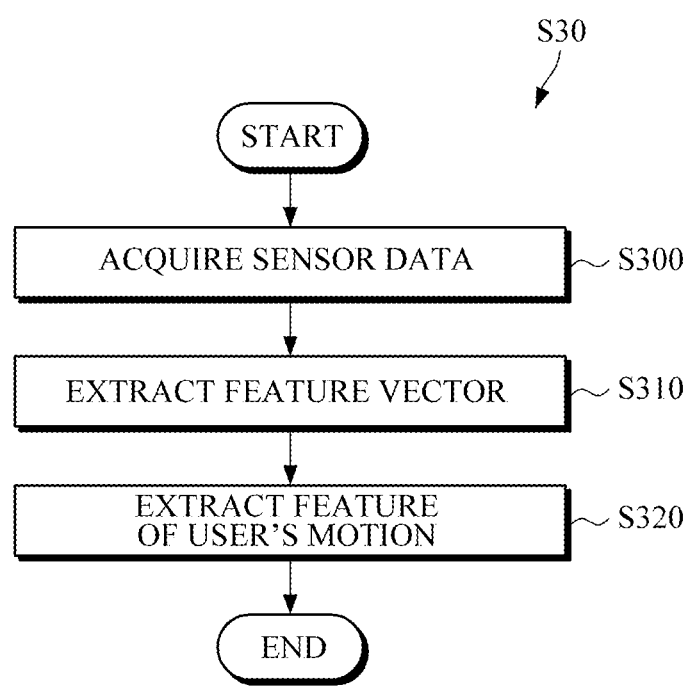
FIG. 8 is a flowchart illustrating a method for extracting motion features of a user, according to an embodiment.

FIG. 8 is a flowchart illustrating a method S30 for extracting motion features of a user, according to an embodiment.

A method for extracting motion features of a user S30 includes acquiring sensor data in S300, extracting a feature vector in S310 and extracting motion features of the user in 320.

In S300, the method acquires sensor data by means of a plurality of sensors.

Then, in S310, the method extracts a feature vector of the user's motions by multiplying a sensor data matrix by a transposed matrix of a basis matrix that is orthogonalized with respect to the sensor data matrix.

That is, by multiplying the sensor data matrix X by the orthogonalized basis matrix $A^T$, the motion features of the user are extracted. For example, if the feature vector of the user's motions is indicated as $\tilde{X}$, $\tilde{X}$ may be calculated by following Formula 15.

$$\tilde{X} \leftarrow A^T X \quad \text{Formula 15}$$

In S320, the method classifies the feature vector extracted in S310 into one type among two or more types of a user's motions, thereby extracting a feature of the user's motion.

In order to classify the feature vector in this manner, in S320, in an example a classification system to classify the inputted feature vector into one type among two or more types of a user's motions is used.

The examples of an apparatus for recognizing a user's motion and the methods for establishing an Orthogonal Non-negative Matrix Factorization (ONMF)-based basis matrix, and for establishing an Orthogonal Semi-Supervised Non-negative Matrix Factorization (OSSNMF)-based basis matrix may provide improved ability to accurately analyze sensor data for a user in motion to characterize the user's motion while also reducing the resource requirements necessary to perform such analysis.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented method, performed by a mobile terminal, of recognizing a user's motions using an Orthogonal Semi-Supervised Non-negative Matrix Factorization (OSSNMF)-based data factorization, the method comprising:
    measuring, using a plurality of sensors by one or more processors of the mobile terminal, sensor data;
    determining, by the one or more processors, label data from the measured sensor data;
    generating, by the one or more processors, a spectrogram of the measured sensor data based on a conversion of the measured sensor data from a time domain to a frequency domain;
    generating, by the one or more processors, first and second motion feature data associated with the user and extracted, using an orthogonal conversion, from the measured sensor data, based on the generated spectrogram of the measured sensor data and the determined label data;
    repeatedly performing, by the one or more processors, the orthogonal conversion, associated with the measured sensor data, while the first and second motion feature data are updated every time when the orthogonal conversion is performed, wherein
    for the repeatedly performing of the orthogonal conversion, the method further includes randomly initializing the first motion feature data, the second motion feature data, and an encoding feature data, and selectively updating the initialized first motion feature data, the initialized second motion feature data, and the initialized encoding feature data while requiring that each of the updated first motion feature data and the updated second feature data are orthogonal and without calculating a respective pseudo-inverse of the initialized first motion feature data and the initialized second motion feature data, so that the performing of the orthogonal conversion does not include performing an additional inversion of the measured sensor data, resulting in improving an accuracy of the extracting of motion features data and reducing resource requirement to perform the orthogonal conversion, thereby improving a performance of the recognizing of the user's motions; and
    performing the recognizing of, by the one or more processors, the user's motions based on extracted motion feature data of the user's motions and combined motion feature data of the first and second motion feature data.

2. The method of claim 1, wherein the repeatedly performing of the orthogonal conversion includes repeating the orthogonal conversion until a result of the performing of the orthogonal conversion is converged to a predetermined value, while an orthogonality between the measured sensor data and orthogonally-converted data of the measured sensor data is maintained, and
    wherein, in response to the result of the performing of the orthogonal conversion being determined to be converged to the predetermined value, the method further comprises terminating the repeatedly performing of the orthogonal conversion and the updating of the first and second motion feature data.

3. A non-transitory computer readable medium including instructions, which when executed by any of one or more processors, cause the one or more processors to perform the method of claim 2.

4. The method of claim 1, wherein the updating of the first and second motion feature data further includes L2-normalizing of the first motion feature data.

5. A non-transitory computer readable medium including instructions, which when executed by any of one or more processors, cause the one or more processors to perform the method of claim 4.

6. The method of claim 1, wherein the first and second motion feature data are respectively represented in a vector form, and the generating of the first and second motion feature data includes extracting the first and second motion feature data using the Orthogonal Semi-Supervised Non-negative Matrix Factorization (OSSNMF)-based data factorization.

7. The method of claim 1, wherein the first and second motion feature data is represented in a vector form, and the combined motion feature data of the first and second motion feature data corresponds to an integrated feature vector including an OSSNMF-based feature vector, the integrated feature vector being generated in the generating of the first and second motion feature data based on the generated spectrogram of the measured sensor data and the determined label data.

8. The method of claim 1, wherein the generating of the first and second motion feature data includes extracting of the first and second motion feature data, further including:
    performing an extracting of the first motion feature data, based on the generated spectrogram of the sensor data and orthogonally-converted data of the measured sensor data, without the additional inversion of the measured sensor data; and
    performing an extracting of the second motion feature data, based on the label data and the measured sensor data.

9. The method of claim 1, wherein the acquiring of the sensor data further includes:
    combining respective sensor information, derived from the plurality of sensors, based on a coordinate system; and
    providing the sensor data that accumulates different types of the respective sensor information derived from the plurality of sensors.

10. The method of claim 9, wherein
    the plurality of sensors for the terminal includes an acceleration sensor, a gyro sensor, and a magnetism sensor.

11. A non-transitory computer readable medium including instructions, which when executed by one or more processors, cause any of the one or more processors of a mobile terminal to perform a method of recognizing a user's motions using an orthogonal semi-supervised non-negative data factorization, the method comprising:

measuring, using a plurality of sensors by one or more processors of the mobile terminal, sensor data;

determining, by the one or more processors, label data from the measured sensor data;

generating, by the one or more processors, a spectrogram of the measured sensor data based on a conversion of the measured sensor data from a time domain to a frequency domain;

generating, by the one or more processors, first and second motion feature data associated with the user and extracted, using an orthogonal conversion, from the measured sensor data, based on the generated spectrogram of the measured sensor data and the label data;

repeatedly performing, by the one or more processors, the orthogonal conversion, associated with the measured sensor data, while the first and second motion feature data are updated every time when the orthogonal conversion is performed, wherein for the repeatedly performing of the orthogonal conversion, the method further includes randomly initializing the first motion feature data, the second motion feature data, and an encoding feature data, and selectively updating the initialized first motion feature data, the initialized second motion feature data and the initialized encoding feature data while requiring that each of the updated first motion feature data and the updated second feature data are orthogonal and without calculating a respective pseudo-inverse of the initialized first motion feature data and the initialized second motion feature data, so that the performing of the orthogonal conversion does not include performing an additional inversion of the measured sensor data, resulting in improving an accuracy of the extracting of motion features data and reducing resource requirement to perform the orthogonal conversion, thereby improving a performance of the recognizing of the user's motions; and performing the recognizing of, by the one or more processors, the user's motions based on extracted motion feature data of the user's motions and combined motion feature data of the first and second motion feature data.

12. A non-transitory computer readable medium including instructions, which when executed by one or more processors, cause any of the one or more processors of a mobile terminal to perform a method of recognizing a user's motions using an orthogonal semi-supervised non-negative data factorization, the method comprising:

measuring, using a plurality of sensors by one or more processors of the mobile terminal, sensor data;

determining, by the one or more processors, label data from the measured sensor data;

generating, by the one or more processors, a spectrogram of the measured sensor data based on a conversion of the measured sensor data from a time domain to a frequency domain;

generating, by the one or more processors, first and second motion feature data associated with the user and extracted, using an orthogonal conversion, from the measured sensor data, based on the generated spectrogram of the measured sensor data and the label data, so that the orthogonal conversion does not include performing an additional inversion of the measured sensor data, resulting in improving an accuracy of the extracting of motion features data and reducing resource requirement to perform the orthogonal conversion, thereby improving a performance of the recognizing of the user's motions;

repeatedly performing, by the one or more processors, the orthogonal conversion, associated with the measured sensor data, while the first and second motion feature data are updated every time when the orthogonal conversion is performed; and performing the recognizing of, by the one or more processors, the user's motions based on extracted motion feature data of the user's motions and combined motion feature data of the first and second motion feature data.

13. The non-transitory computer readable medium of claim 12, wherein the repeatedly performing of the orthogonal conversion further includes:

randomly initializing the first motion feature data, the second motion feature data, and an encoding feature data; and selectively updating the initialized first motion feature data, the initialized second motion feature data, and the initialized encoding feature data while requiring that each of the updated first motion feature data and the updated second feature data are orthogonal and without calculating a respective pseudo-inverse of the initialized first motion feature data and the initialized second motion feature data.

14. The non-transitory computer readable medium of claim 12, wherein the first and second motion feature data are respectively represented in a vector form, and the generating of the first and second motion feature data includes extracting the first and second motion feature data using the Orthogonal Semi-Supervised Non-negative Matrix Factorization (OSSNMF)-based data factorization.

15. The non-transitory computer readable medium of claim 12, wherein the first and second motion feature data are respectively represented in a vector form, and the combined motion feature data of the first and second motion feature data corresponds to an integrated feature vector including an OSSNMF-based feature vector, the integrated feature vector being generated based on the generated spectrogram of the measured sensor data and the determined label data.

16. The non-transitory computer readable medium of claim 12, wherein the generating of the first and second motion feature data includes extracting the first and second motion feature data, further including:

performing an extracting of the first motion feature data, based on the generated spectrogram of the sensor data and orthogonally-converted data of the measured sensor data, without the additional inversion of the measured sensor data; and performing an extracting of the second motion feature data, based on the label data and the measured sensor data.

17. The non-transitory computer readable medium of claim 12, wherein the acquiring of the sensor data further includes:

combining respective sensor information, derived from the plurality of sensors, based on a coordinate system; and providing the sensor data that accumulates different types of the respective sensor information derived from the plurality of sensors.

* * * * *